Patented Apr. 1, 1930

1,752,365

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

METHOD OF PURIFYING PHENYL ETHYL ALCOHOL

No Drawing.     Application filed June 9, 1923. Serial No. 644,476.

There are a number of well known methods or processes whereby phenyl ethyl alcohol may may be synthetically prepared but the product from all of these processes is contaminated with impurities which are rather difficult to eliminate; while phenyl ethyl alcohol in order to be of good color and odor must be extremely pure. The usual method of purification, involving the use of anhydrous calcium chloride is not satisfactory as it does not give at once a pure product.

The impurities encountered in such product include various high-boiling alcohols as well as small amounts of low-boiling alcohols, methyl, ethyl and the like, or alcohols decomposed by caustic solution as chlorhydrin, bromhydrin and the like. The object of the present invention is to provide an improved method of preparing phenyl ethyl alcohol whereby substantially all of the impurities thus encountered may be readily and substantially completely removed, the only materials found inseparable being such high-boiling alcohols as geraniol, citronelol and the like. To the accomplishment of the foregoing and related ends the invention then consists of the steps hereinafter fully described and particularly pointed out in the claims, the following description setting forth several of the various ways in which the principle of the invention may be used.

My present improved method of purification rests on the discovery that phthalic anhydride, as well as certain other anhydrides of similar constitution, such as maleic anhydride and succinic anhydride, will readily react with phenyl ethyl alcohol either alone or in benzene, toluene, ether or equivalent solvent medium to form monophenyl ethyl ester of the acid corresponding to such anhydride. There is, in other words, no occasion to form the sodium alcoholate before reaction with phthalic anhydride as involved in the so-called Tieman and Krüger method (Ber. 29, 902) which was the method employed by Soden and Rojahn (Ber. 33, 1723) for purifying the phenyl ethyl alcohol prepared by them from phenyl acetaldehyde by reduction with zinc and acetic acid.

In general, such Tieman and Krüger method consists in reacting on alcohol in an indifferent medium with sodium to form the sodium alcoholate and then reacting on this sodium alcoholate with phthalic anhydride to form the monosodium alcohol phthalate. The latter is then dissolved in water and separated from impurities in the organic solvents used, the water solution of the phthalate acidified, the free acid alcohol phthalate separated and purified and finally hydrolyzed to the free alcohol with excess caustic.

In accordance with my present improved procedure a cold solution of alkali or alkaline earth hydroxides or alkali carbonates is added to the monophenylethyl phthalate formed as aforesaid. As a result, such phthalate is converted to the alkali or alkaline earth salt and dissolves or suspends in the water. Where the first reaction, viz that between the phthalic anhydride and the crude phenyl ethyl alcohol is conducted in a solvent medium such as described, such medium will dissolve the major portion of all the impurities originally present in the alcohol, and if the reaction in question is carried out directly, then such solvent medium will be added at this point thus to remove the major portion of such impurities. The alkali hydroxides or carbonates are preferred for the foregoing neutralization, since the alkaline earth salts of the phthalate are for the most part insoluble.

For certain purposes the foregoing purification may be considered sufficient and in such event the phthalate salt will be separated from the solvent medium which carries such impurities and such salt thereupon hydrolyzed to give back the alcohol.

However, certain impurities such as diphenyl if present can not be removed by simple separation of the salt solution from the benzene, toluene, or other solvent medium, and in such case I have discovered that a neutral or very slightly acid water solution or suspension of the salt can be steam distilled without suffering appreciable hydrolysis, and hence any impurities that will steam distill can be eliminated in this way.

After steam distillation which as indicated may or may not be found or considered necessary, excess caustic soda or potash is added and the reaction mixture heated, whereupon the monophenylethyl phthalate salt is hydrolyzed to phenyl ethyl alcohol and the sodium or potassium salt, as the case may be, of phthalic acid. Other hydrolyzing agents may be used, such as lime or soda, but the alkalies are preferred. It will be understood, of course, that in this hydrolysis, as in all others, water is the active material, the alkaline compound merely combining with the phthalic acid as fast as it is formed. The foregoing procedure will remove any impurities which are decomposed by the preceding step of boiling in alkaline solution.

The phenyl ethyl alcohol thus formed may be removed from the reaction mixture by extraction with solvent such as ether or benzene or may be steam distilled and then extracted, or may be separated as a layer. The solution of the alcohol thus obtained is then fractionated, the lower boiling solvent and residual impurities removed, and the phenyl ethyl alcohol finally distilled under reduced pressure. The sodium phthalate solution may be acidified to recover phthalic acid and the latter converted back to the anhydride by suitable heating.

For the purpose of a clearer understanding of the several steps of the process described above, the following more detailed statement, with equations illustrative of the reactions is given:—

One molecule of phenyl ethyl alcohol (analysis of crude) is dissolved in ten times its weight of dry benzene, one molecule or more of phthalic anhydride added, and the whole refluxed.

(1) $C_6H_5.CH_2.CH_2.OH + C_6H_4$ 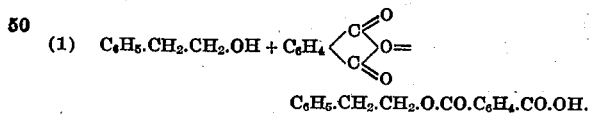

$C_6H_5.CH_2.CH_2.O.CO.C_6H_4.CO.OH.$

The benzene solution is cooled and treated with excess of caustic soda solution, the layers separated and the benzene layer distilled to recover benzene. The aqueous layer is then made neutral, steam distilled and at the end of the steam distillation it is treated with one molecule or more of caustic soda solution and heated for some time. The reaction mixture is then extracted with benzene, and the benzene layer distilled to recover the benzene. While the aqueous layer is acidified with sulphuric acid and the phthalic acid is removed by wheeling. Finally the phthalic acid is dried and converted to phthalic anhydride by heat.

(2) $C_6H_5.CH_2.CH_2.O.COC_6H_4.COOH + NaOH = $
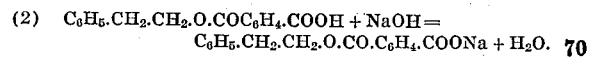

(3) $C_6H_5.CH_2.CH_2.OCOC_6H_4.COONa + NaOH = $
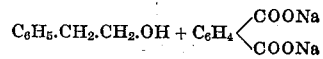

(4) $C_6H_4.(COONa)_2 + H_2SO_4 = C_6H_4.(COOH)_2$ (5) $C_6H_4(COOH)_2 + heat = C_6H_4$ 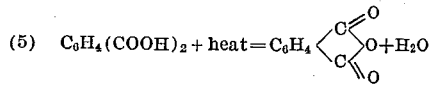

While in the foregoing description I have referred specifically to the use of phthalic anhydride, it should be explained that any available anhydride of ethane $\alpha$-$\beta$-dicarboxylic acid or a derivative of such acid wherein the carboxyl groups are on adjacent carbon atoms, equally with such phthalic anhydride, may be satisfactorily employed at least to the point in the process corresponding with the separation of the solution of the phthalate salt, as hereinbefore described, from the accompanying solvent medium. As other examples of compounds of the class described I may name maleic and succinic, and for the purpose of convenient designation, in the claims hereinafter, such suitable compounds will be inclusively referred to as anhydrides of dibasic organic acids, whether of the aromatic or fatty series.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. A process of purifying synthetic phenyl ethyl alcohol, which comprises selectively converting the phenyl ethyl alcohol content of the impure crude alcohol into a mono-phenyl ethyl phthalate salt of an alkali-forming metal in water solution, washing such solution with an organic solvent in which the reactants are soluble but non-reactive therewith, and hydrolyzing the phthalate salt into phenyl ethyl alcohol.

2. A process of purifying synthetic phenyl ethyl alcohol, which comprises selectively converting the phenyl ethyl alcohol content of the impure crude alcohol into a mono-phenyl ethyl phthalate salt of an alkali-forming metal in water solution, distilling off impurities, and hydrolyzing such phthalate salt into phenyl ethyl alcohol.

3. A process of purifying synthetic phenyl ethyl alcohol, which comprises selectively converting the phenyl ethyl alcohol content of the impure crude alcohol into a mono-phenyl ethyl phthalate ester, treating with caustic alkali solution, washing the resulting solution with an organic solvent in which the reactants are soluble but non-reactive therewith, distilling off impurities from the phthalate salt solution, and hydrolyzing into phenyl ethyl alcohol.

4. A process of purifying synthetic phenyl ethyl alcohol, which comprises selectively converting the phenyl ethyl alcohol content of the impure crude alcohol into the ester of a dibasic organic acid wherein the carboxyl groups are on adjacent carbon atoms, treating such ester with the hydroxide of an alkali-forming metal in the presence of water, washing such solution with an organic solvent in which the reactants are soluble but non-reactive therewith, and hydrolyzing into phenyl ethyl alcohol.

5. A process of purifying synthetic phenyl ethyl alcohol, which comprises selectively converting the phenyl ethyl alcohol content of the impure crude alcohol into the ester of a dibasic organic acid wherein the carboxyl groups are on adjacent carbon atoms, treating such ester with the hydroxide of an alkali-forming metal in the presence of water, distilling off impurities from such solution, and hydrolyzing into phenyl ethyl alcohol.

6. A process of purifying synthetic phenyl ethyl alcohol, which comprises selectively converting the phenyl ethyl alcohol content of the impure crude alcohol into the ester of a dibasic organic acid wherein the carboxyl groups are on adjacent carbon atoms, treating such ester with the hydroxide of an alkali-forming metal in the presence of water, washing such solution with an organic solvent in which the reactants are soluble but non-reactive therewith, distilling off impurities from such solution, and hydrolyzing into phenyl ethyl alcohol.

Signed by me, this 1st day of June, 1923.

EDGAR C. BRITTON.